United States Patent [19]

Carlson

[11] Patent Number: 4,830,550
[45] Date of Patent: May 16, 1989

[54] HAND HELD DRILLING TOOL FOR REMOVING SPOT WELDS

[76] Inventor: Robert S. Carlson, 4510 SW. Carson St., Portland, Oreg. 97219

[21] Appl. No.: 104,274

[22] Filed: Oct. 5, 1987

[51] Int. Cl.⁴ .............................................. B23B 41/00
[52] U.S. Cl. .................................. 408/72 R; 408/87; 408/102; 408/112; 408/137; 408/241 S
[58] Field of Search ....................... 408/14, 15, 84, 87, 408/101, 102, 110–112, 137, 138, 95, 97, 241 S, 72 R, 72 B

[56] References Cited

U.S. PATENT DOCUMENTS

| | | | |
|---|---|---|---|
| 3,526,158 | 9/1970 | Adams et al. | 408/97 |
| 4,012,161 | 3/1977 | Shultz | 408/112 X |
| 4,735,528 | 4/1988 | Parrone | 408/112 X |

*Primary Examiner*—Steven C. Bishop
*Attorney, Agent, or Firm*—Chernoff, Vilhauer, McClung & Stenzel

[57] ABSTRACT

A drilling tool for removing spot welds includes a central shaft having a threaded portion which extends through a center nut and washer assembly. A pair of oppositely opposed compression springs bear on the center nut and washer assembly to maintain it in a fixed position. Stops located on the shaft engage the center nut and washer assembly to limit the forward travel of the drill bit. This ensures that the drill bit has a predetermined stroke length. The springs provide compression for the drill bit as the shaft rotates thus forcing the drill bit into the workpiece, but with some resilience so that the drill does not bind up.

13 Claims, 2 Drawing Sheets

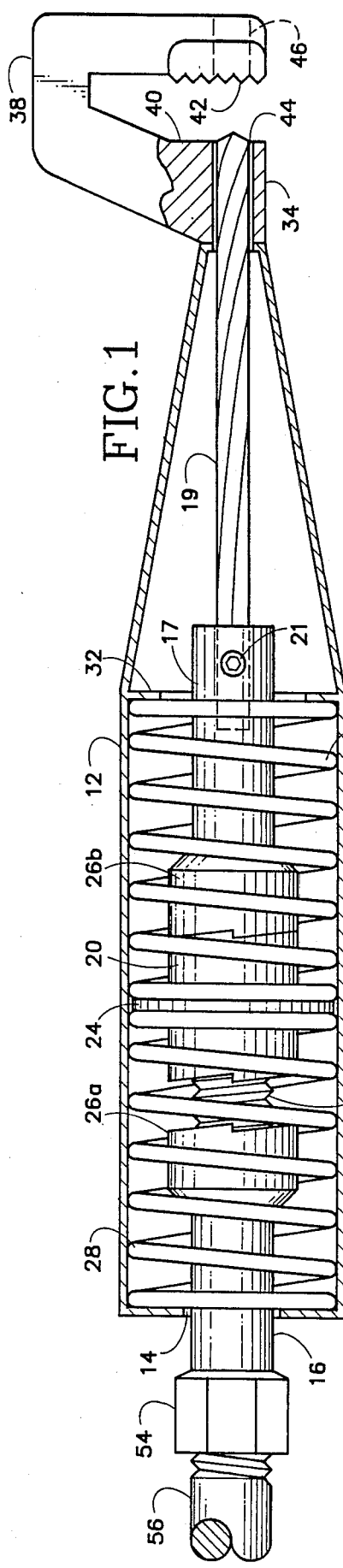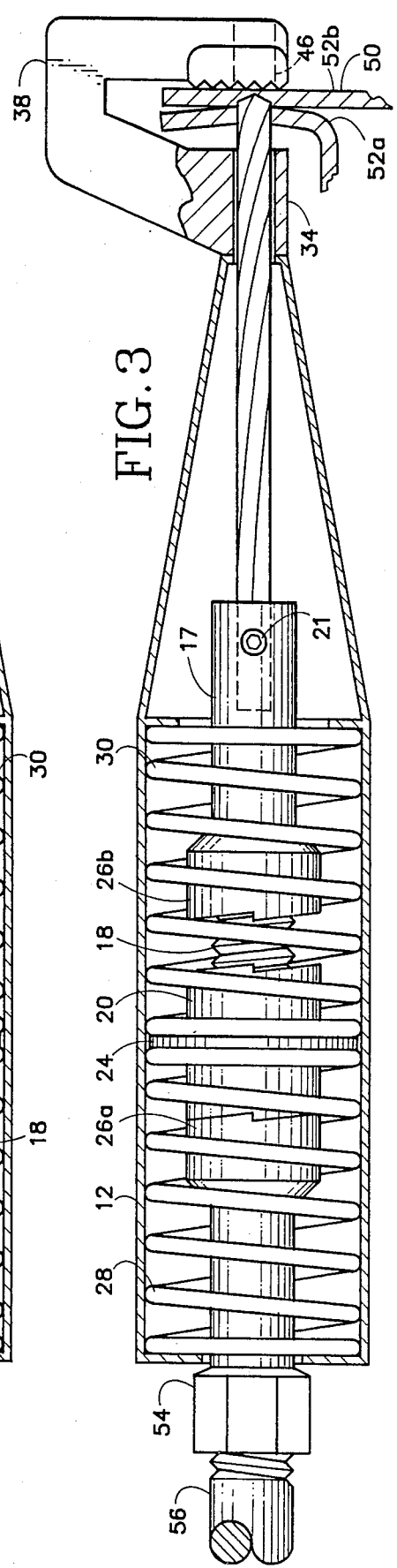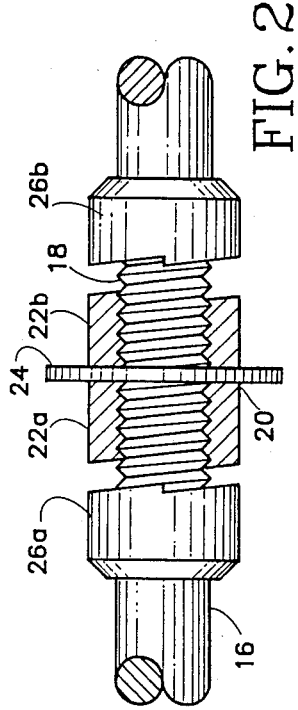

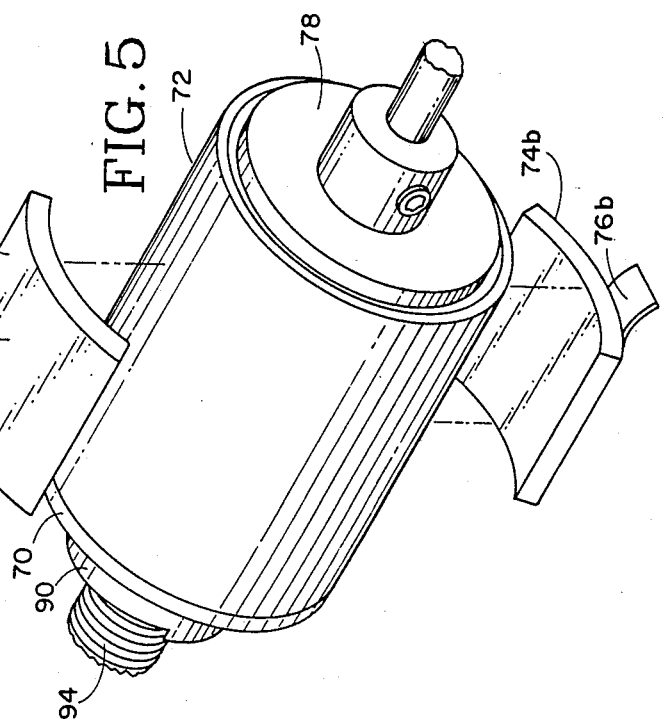

4,830,550

HAND HELD DRILLING TOOL FOR REMOVING SPOT WELDS

The following invention relates to a hand held drilling tool having a limited stroke or penetration depth for automatically removing spot welds joining pieces of metal such as those found on automobile bodies.

One of the most time consuming tasks in the repair of automobile bodywork is the removal of spot welds which hold together various portions of the automobile chassis. Especially time consuming is the removal of spot welds along the bottom portions of the chassis which facilitate the removal of body panels for repair or replacement. In the past it has been necessary to use a hand drill to drill through the spot weld to remove a first panel without drilling unnecessarily deeply into an underlying frame member or panel. This is exceedingly difficult to do with a hand drill that is used in the conventional manner, that is, by applying pressure to force the drill bit into the spot weld, because the user cannot tell where the first panel ends and the second panel begins. Other problems include a tendency for the drill to "walk" until a hole has been started. Also, when using hand-applied pressure on the drill, the drill bit can freeze up and become locked in the hole.

The removal of spot welds accounts for a large portion of the time required for automobile body repair work, which drives up the cost for such work considerably. What is needed, therefore, is a drill having a limited penetration depth which can engage and remove spot welds quickly and efficiently and with a minimum degree of effort.

SUMMARY OF THE INVENTION

The present invention comprises a drill having a limited penetration depth which includes a rotating shaft with a drill bit mounted thereon. The shaft includes a threaded portion with stop members located at each end thereof and a center nut and washer assembly threadingly mounted thereon for engaging the stop members in abutting locking relation when the drill has moved to the predetermined penetration depth. A pair of opposed springs compressively engaging the nut and washer assembly holds the assembly in a predetermined position relative to the desired penetration depth of the drill.

The springs may be held within a housing so as to apply compression to the nut and washer assembly from opposite directions. The housing also includes a forward end having a gripping head mounted thereon for engaging a workpiece which contains the spot weld. The gripping head includes front and rear mutually opposing face members joined by a span which defines a space between the face members for receiving the workpiece. This holds the workpiece and prevents the drill from "walking." The front face includes an aperture for receiving the drill bit and the rear face includes a rough or serrated portion so that the tool is held stationary against the workpiece as the drill comes into contact with the spot weld.

It is a principal object of this invention to provide a drilling tool for removing spot welds in an economic and efficient manner.

A further object of this invention is to provide a drilling tool having a limited stroke for automatically drilling to a predetermined depth and then stopping.

A still further object of this invention is to provide a drilling tool which will not "walk" or bind up as it drills into a work piece.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side cutaway view of the drilling tool comprising the present invention with the drill bit in a fully retracted position.

FIG. 2 is a partial cutaway side view of a portion of the drill shaft of the tool shown in FIG. 1 with the centering springs removed.

FIG. 3 is a side view of the drilling tool of FIG. 1 with the drill bit in a fully extended position engaging a work piece.

FIG. 4 is a partial side cutaway view of an alternative embodiment of the invention employing a brake assembly.

FIG. 5 is a perspective view of the brake assembly portion of the tool of FIG. 4.

DETAILED DESCRIPTION OF THE INVENTION

Referring now to FIG. 1, a drill for removing spot welds 10 includes a housing 12. The housing 12 includes a rear aperture 14 which permits the insertion of a drill shaft 16. The drill shaft 16 includes a threaded portion 18 (best shown with reference to FIG. 2). A nut and washer assembly 20 is threadingly mounted on the threaded portion 18 of the shaft 16. The assembly 20 comprises a pair of oppositely disposed nuts 22a and 22b sandwiching a washer 24. The nuts 22a and 22b have outwardly facing cylindrical helical surfaces. Mounted at opposite ends of threaded portion 18 are a pair of stops 26a and 26b which have inwardly facing cylindrical helical surfaces. The pitch of the cylindrical helical surfaces on stops 26a and 26b matches the pitch of the outwardly facing cylindrical helical surfaces on nuts 22a and 22b so that a stop will lock together with its respective nut when the drill shaft rotates to either end position forcing the stop against the nut.

The center nut and washer assembly 20 is held in a centered position by a pair of compressive springs 28 and 30. Spring 28 presses against the nut and washer assembly 20 from the back wall of the housing 12, and spring 28 is held in place within the housing 12 by an annular flange 32.

The shaft 16 extends through the rear housing aperture 14 and the annular flange 32 into a forward portion 34 of the housing which is threaded. A gripping head 38 which comprises front and rear mutually opposing face members 40 and 42 is joined by a span so as to define a space therebetween for receiving a work piece 50 (refer to FIG. 3). Workpiece 50, which is typical of automobile body construction, includes two panels 52a and 52b joined together by a spot weld. Rear face member 42 is serrated and both face members 40 and 42 are bored with apertures 44 and 46, respectively, to permit the intrusion of a drill bit 19.

The drill shaft 16 includes a mounting 17 for receiving a drill bit 19. The drill bit 19 may be secured within the mounting 17 by a screw 21. At the other end of drill shaft 16 is an annular threaded mounting 54 which may accommodate a drive shaft 56. The drive shaft 56 may be powered by any conventional means.

In operation, the workpiece 50 is engaged by the gripping head 38 and power is applied to the drive shaft 56. Since the center nut assembly 20 is held in a predetermined position relative to the housing 12 by the springs 28 and 30, the nut assembly 20 will remain stationary as the drill shaft 16 rotates. Rotation of the drill shaft 16 will eventually carry one of the stop members either 26a or 26b into locking engagement with either nut 22b or 22a depending upon whether the shaft is rotating in a clockwise or counterclockwise direction. When this occurs, there will be no further linear penetration by the drill bit 19 into the workpiece 50. At this point the drill bit 19 will merely spin at the depth limit boring out the hole previously drilled. The drill bit 19 will not bind up because the back pressure on the drill shaft 16 caused by the rake of the drill bit 19 can be accommodated by the resilience of spring 30. In other words, it is spring 30 and not longitudinal pressure from the operator which urges the drill bit into the middle of the workpiece 50, because as the shaft rotates, the centering springs 28 and 30 maintain assembly 20 in a central location while the drill bit 19 moves forward. The resilient loading of the spring 30 thus allows for a more gentle boring action which does not force the drill bit 19 into the workpiece 50 with such pressure that it tends to bind up or jam. The drill bit 19 does not walk in relation to the workpiece 50 because it is held in the gripping head 38 which contains on the outer face 42 a rough or serrated surface which holds the workpiece in place.

The penetration depth of the drill bit may be set in a number of ways. First, the gripping head 38 may be screwed onto the forward end 34 of the housing 12 to a depth which may be calibrated to yield the desired amount of drill penetration. For example, as FIG. 3 shows, it is often desirable to drill through the first panel 52a of a spot welded joint and to drill part of the way into the second panel 52b. Performing automobile body work, this is frequently advantageous so as to drill through the galvanizing material to the steel which will permit a subsequent spot weld to be applied when a new panel is to be installed. All the operator need do is engage the workpiece 50 with the tool and the spot weld is automatically drilled out. The springs 28 and 30 supply the pressure and the stops 26a and 26b limit the penetration depth.

A second embodiment of the invention is shown in FIGS. 4 and 5. In FIG. 4 a housing 60 includes a forward end 62 for accepting a hollow threaded fitting 64. A drill bit 61 extends through the fitting 64 and a gripping head 66 similar to that shown in FIGS. 1 and 3 is affixed to the fitting 64 which may be screwed onto end 62. A shaft 96 is carried by the housing 60 and includes a threaded portion 94. A nut 68a is welded to forward end 62 and a lock washer 68b secures the gripping head 66 to the housing 60 at the position desired by the user.

A center washer 70 similar to center washer 24 in FIGS. 1 and 3 is welded to a brake cylinder 72. Brake pads 74a and 74b are urged against the brake cylinder 72 by leaf springs 76a and 76b. A pair of end thrust bearings 78 and 80 allow compression springs 82 and 84 to rotate along with center washer 70 without causing wear to the interior portions of the housing 60. The friction applied to the brake cylinder 72 by brake pads 74a and 74b ensures that the springs 82 and 84 and center washer 70 will not rotate until one of a pair of stops 86 or 88 has locked to either locking nut 90 or 92, respectively. Thus, the pressure exerted by the leaf springs 76a and 76b is just enough to counter the friction between the threaded portion 94 of shaft 96 and the center washer assembly consisting of locking nuts 90 and 92 sandwiching center washer 70 and the end of brake cylinder 72. The pressure of the brake pads 74a and 74b on brake cylinder 72 is not so great, however, as to impede the rotation of the center washer 70, and brake cylinder 72, when the shaft 96 is at either end position, that is, whenever stop 88 is mated with locking nut 92 or stop 86 is mated with locking nut 90. In such a case, the springs 82 and 84 along with the brake cylinder 72 freely rotate as permitted by the end thrust bearings 80 and 78. With this arrangement there is no wear on any of the parts of the housing 60. All wear occurs between the brake pads 74a and 74b and the brake cylinder 72. The brake pads 74a and 74b are replaceable wear parts which may be replaced as often as needed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A hand-held drilling tool having a limited penetration depth comprising:
    (a) a rotating shaft having a drill bit mounted thereto, said shaft including a threaded portion and including stop members located at each end thereof;
    (b) stationary washer means threadingly mounted on said threaded portion of said shaft having means affixed thereto for engaging said stop members in abutting locking relation; and
    (c) spring means for holding said stationary washer means in a predetermined position so as to urge said drill bit into a workpiece as said shaft rotates.

2. The drilling tool of claim 1 wherein said spring means comprises a pair of opposed springs abutting said washer means and applying compressive force thereto from opposite directions.

3. The drilling tool of claim 1 further including a gripping head mounted to a forward end of said drilling tool for engaging a work piece, said gripping head including front and rear mutually opposing face members joined by a span thereby defining a space therebetween for receiving said workpiece.

4. The drilling tool of claim 3, further including a housing for containing said rotating shaft, said stationary washer means and said spring means.

5. The drilling tool of claim 4 wherein said housing includes a threaded forward end having locking means for selectively mounting said gripping head to said housing at variable longitudinal positions along the length thereof.

6. The hand-held drilling tool of claim 1, further including end thrust bearing means for permitting rotation of said spring means and said stationary washer means.

7. The hand-held drilling tool of claim 6, further including a brake cylinder affixed to said stationary washer means and brake pad means for providing a frictional force resisting the rotation of said spring means and said stationary washer means.

8. A drilling tool for removing spot welds comprising:

(a) a housing containing a rotating drill shaft including a drill bit;

(b) a gripping head mounted to one end of said housing for engaginq a workpiece containing said spot weld, said gripping head including front and rear mutually opposing face members joined by a span defining a space therebetween for receiving said work piece; and (c) stop means disposed within said housing for limiting the length of penetration of said drill bit into said space to a predetermined stroke length therein said stop means comprises a stationary washer threadingly mounted on siid drill shaft and held in a predetermined position within said housing, and at least one stop member mounted on said drill shaft for engaging said stationary washer when the rotation of said drill shaft brings said stop member into abutment therewith.

9. The drill of claim 8 wherein said stop means further comprises spring means for holding said stationary washer in said predetermined position.

10. The drill of claim 9 wherein said spring means comprises a pair of springs mounted within said housing so as to apply compression to said washer means from opposite directions.

11. A drilling tool for removing spot welds comprising:

(a) a housing containing a rotating drill shaft including a drill bit;

(b) a gripping head mounted to one end of said housing for engaging a workpiece containing said spot weld, said gripping head including front and rear mutually opposing face members joined by a span defining a space therebetween for receiving said workpiece, said gripping head being threadingly mounted to a forward end of said housing and further including locking means to secure said gripping head to said forward end at variable locations along the length thereof to provide an adjustment for the length of penetration of said drill bit into said space between said face members; and (c) stop means disposed within said housing for limiting the length of penetrtion of said drill bit into said space to a predetermined stroke length.

12. The drilling tool of claim 11 wherein said stop means comprises a stationary washer held in position by a pair of mutually opposed spring members.

13. The drilling tool of claim 11 wherein said stop means is threadingly mounted on said rotating drill shaft and includes braking means coupled thereto for preventing the rotation of said stop means as said shaft moves between a fully engaged and a fully retracted position.

* * * * *